United States Patent [19]

Roberts, Sr.

[11] Patent Number: 5,375,758
[45] Date of Patent: Dec. 27, 1994

[54] WELDING METHOD OF AND APPARATUS FOR RECONDITIONING HARD METAL PRODUCTS

[76] Inventor: J. Lindsey Roberts, Sr., Rte. 11, Box 93, Lake City, Fla. 32055

[21] Appl. No.: 210,274

[22] Filed: Mar. 18, 1994

[51] Int. Cl.$^5$ .............................................. B23K 9/04
[52] U.S. Cl. .................... 228/119; 228/46; 228/48; 219/76.11
[58] Field of Search ............ 228/46, 48, 119, 222; 219/76.11

[56] References Cited

U.S. PATENT DOCUMENTS

| | | | |
|---|---|---|---|
| 2,457,704 | 12/1948 | Mitchell et al. | 228/46 X |
| 2,912,562 | 11/1959 | Donovan | 219/76.12 |
| 3,213,709 | 1/1966 | Foley, Jr. et al. | 219/76.12 |
| 3,611,541 | 1/1970 | Garrett | 219/76.11 X |
| 3,626,147 | 12/1971 | Sato | 219/136 |
| 3,948,428 | 4/1976 | Bonomo et al. | 228/46 |
| 3,985,995 | 10/1976 | Brandi et al. | 219/76.11 |
| 3,988,179 | 10/1976 | Del Paggio et al. | 219/10.69 |
| 4,230,928 | 10/1980 | Janssen | 219/76.11 |
| 4,660,756 | 4/1987 | Geisseler | 228/48 X |
| 4,671,448 | 6/1987 | Million et al. | 219/76.12 X |
| 4,857,694 | 8/1989 | Doyle et al. | 219/76.12 |

OTHER PUBLICATIONS

"Unraveling the Mysteries of Welding Cast Iron" by S. D. Kiser and Bob Irving, from the Welding Journal, pp. 39–44.

*Primary Examiner*—Kenneth J. Ramsey
*Attorney, Agent, or Firm*—Diller, Ramik & Wight

[57] ABSTRACT

This disclosure is directed to a method of and apparatus for applying a weld bead upon a surface of a chilled white iron product by (a) moving a surface of the product along a predetermined path of travel in a desired direction, (b) directing a stream of air upstream of a weld point against the surface which is to be welded, (c) forming a continuous weld bead downstream of the stream of air, (d) directing a stream of water at a portion of the formed weld bead located downstream of the weld point, and (e) immersing the weld bead essentially immediately upon its formation.

35 Claims, 2 Drawing Sheets

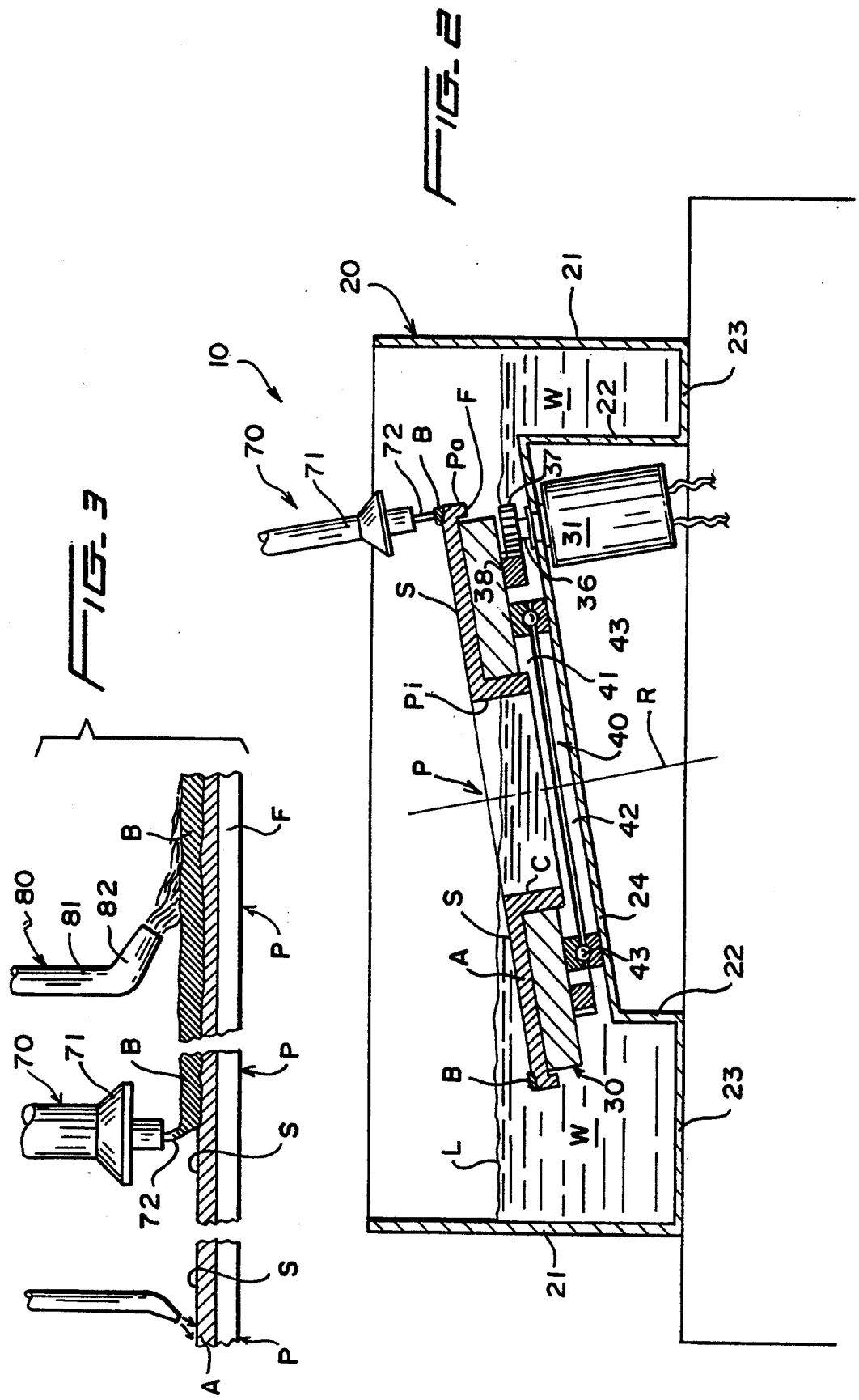

WELDING METHOD OF AND APPARATUS FOR RECONDITIONING HARD METAL PRODUCTS

BACKGROUND OF THE INVENTION

It is conventional to "resurface," so to speak, surfaces of a variety of metal products when such surfaces become worn or are otherwise incapable of structurally performing their intended functions. For example, in U.S. Pat. No. 2,912,562 issued on Nov. 10, 1959 to George C. Donovan, a method is disclosed for depositing weld metal by electric arc welding over the entire inner surface of a cast iron cylinder liner used in railroad locomotives. Such cylinder liners are generally made from relatively soft cast iron and are mounted for rotation about a central axis thereof upon a lathe which also includes a lathe carriage for reciprocating the cylinder parallel to its axis. A welding wire (core and flux) is supported interiorly of the cylinder and is supplied appropriate welding current during the rotation and reciprocation of the cylinder which places what amounts to a weld deposit in the form of a helical, slightly overlapping bead upon the interior surface of the cast iron cylinder liner. The thus reconditioned cylinder liner can then be re-bored or otherwise machined to its original diameter for subsequent use.

As another example, U.S. Pat. No. 3,985,995 granted on Oct. 12, 1977 to Herman Th. Brandi discloses a method of manufacturing large diameter metal shafts for turbines and electric generators by feeding welding electrode from a storage reel to a core upon which molten metal is built-up along a spiral track. The core is rotated as the welding head travels axially, thus forming layer-upon-layer of helical beads to form the main body of a shaft.

In U.S. Pat. No. 4,660,756 granted on Apr. 28, 1987 to Max Geissler, a cylindrical member is rotated about its axis as its interior is built-up by the formation of a continuous helical welding bead In this case cooling water is sprayed through atomizer nozzles onto the inside wall which is being welded with excessive water being collected and removed by a pump.

It is also conventional to utilize multi-layer build-up welding to manufacture annular components, as evidenced by U.S. Pat. No. 4,671,448 granted Jun. 9, 1987 to Karl Million et al. An annular component upon which weld material is to be deposited is supported upon a turntable inclined to the horizontal which is rotated relative to a welding head for progressively building up weld material along an annular face of the annular component.

The utilization of cooling water which is brought into contact with a hot weld in a restricted zone located immediately under the molten bath is also well known from U.S. Pat. No. 3,948,428 granted on Apr. 6, 1976 to Franco Bonomo et al.

U.S. Pat. No. 4,230,928 granted Oct. 28, 1980 to Harvey W. Janssen is specifically directed to a machine for rebuilding worn tractor roller assemblies by depositing hard metal on the rim of the assembly while the assembly is rotated and cooled by circulating coolant therethrough.

U.S. Pat. No. 4,857,694 granted on Aug. 15, 1989 to Thomas E. Doyle et al. discloses an apparatus for automatically cooling a workpiece during its rotation as the workpiece is being externally built-up by applying a weld bead thereto through an associated welding head. The temperature is sensed in the vicinity of the welding head to generate appropriate coolant flow with appropriate control system programming being accomplished through a conventional computer or microprocessor control system, such as an IBM PC.

In the August 1993 publication of the WELDING JOURNAL there appears at pages 39 through 44 an article entitled "Unraveling the Mystries of Welding Cast Iron" by S. D. Kiser and Bob Irving. The article specifically states "white iron is a cast iron in which substantially all of the carbon is in solution and in the combined form. The metal has a white fracture surface when broken. It is considered to be unweldable by conventional processes." (See page 39.) Table 1 depicts the effect of microstructure and graphite morphology on the weldability of various cast irons, and indicates that white iron (cementite matrix) essentially lacks graphite and because of its approximate 0% elongation, it is incapable of being welded by virtually any known welding process because such "structures have little to no graphite inclusions and have no plastic ductility to resolve the stresses imposed by welding thermal cycles. These irons are considered to be unweldable by most fusion processes." (See page 41.) The article makes specific reference to welding a variety of products, such as repairing a gray iron take-up drum, a gray iron piercing ram for an extrusion press, carbon steel steering tubes and carbon steel heat exchanger shelves and tubes, but no examples of successful welding or surfacing of white iron or white cast iron is found in this article which reflects the conclusion earlier quoted from this article, namely, white iron "is considered to be unweldable by conventional processes." (See page 39.)

The foregoing reflects the conventionality of welding products, including rotating and translating a product relative to a welding head to build-up a surface of the product by applying thereto a generally continuous welding bead. However, in virtually all cases, the metal product is made of relatively soft metal, and though harder metal may be applied thereto, heretofore there has been no method known to the inventor for applying a welding bead to extremely hard metal, such as "chilled white iron." Products such as wear plates or suction plates for large hydraulic pumps in sizes ranging between 20 inches and 36 inches in outside diameter are made from chilled white iron, and once worn out, such plates were simply removed and replaced because heretofore efforts at building-up the same up through welding was not perceived possible. However, in accordance with the present invention, a novel method has been provided whereby a weld bead is placed continuously upon a surface of chilled white iron products, such as the aforementioned wear plates and suction plates, to effectively recondition the same for reuse, as opposed to being heretofore discarded.

SUMMARY OF THE INVENTION

In accordance with a novel method of the present invention, a weld bead is applied upon a surface of a relatively hard metal product by moving the product along a predetermined path of travel in a desired direction of travel. A stream of air is directed at a first surface portion of the product, followed by the formation of a continuous weld bead and immediately following the latter, a stream of water is directed against the formed weld bead to quench the same. Thus, the surface of the hard metal product is sequentially blown dry, welded and quenched.

Preferably the product is rotated with respect to the stream of air, a welding head and the stream of water during the sequential steps of blow-drying, welding and water quenching.

In further accordance with the present invention, the hard metal product is made of chilled white iron and when of an annular configuration, such as a wear plate or a suction plate of a hydraulic pump, a substantial/major portion of the annular product is maintained continuously immersed in a bath of water during the rotation thereof, and preferably the bath of water is confined in a drum associated with a pump for utilizing the bath water as the quenching water which is directed as a stream during the formation of the weld bead.

In further accordance with the present method, the blow-drying, welding and quenching steps are performed simultaneously, and transverse indexing relative to the path of travel is automatically effected so that the weld bead is essentially a continuous spiral bead when applied to an annular product in side-by-side slightly overlapping relationship which effectively reconditions or resurfaces an entire annular face of the annular product.

In further accordance with the present invention, the method is performed by a novel apparatus which includes a turntable for supporting a chilled white iron annular product within a tank with the turntable axis being inclined to the vertical such that an appreciable portion of the annular product is maintained immersed in the quenched bath water. A common head carries an air nozzle, a weld wire and a water nozzle in the latter order relative to the direction of rotation of the annular product such that any specific portion thereof is first blown dry, a weld is formed thereon and subsequently the weld is water quenched. The apparatus also includes appropriate controls for indexing the head transversely relative to the direction of rotation/path of travel of the annular product to thereby create a spiral weld in slightly overlapping relationship across any annular portion or the entire annular portion of the annular product.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 2 is a vertical cross-sectional view through the turntable and annular product of FIG. 1, and illustrates a drive mechanism for the turntable and the manner in which the annular product is partially immersed in a liquid bath of an associated tank or container.

FIG. 3 is an enlarged fragmentary elevational view of the air nozzle, weld head and water nozzle relative to a surface of the annular product upon which is applied a continuous weld bead.

DESCRIPTION OF THE PREFERRED EMBODIMENT

Figure 1:
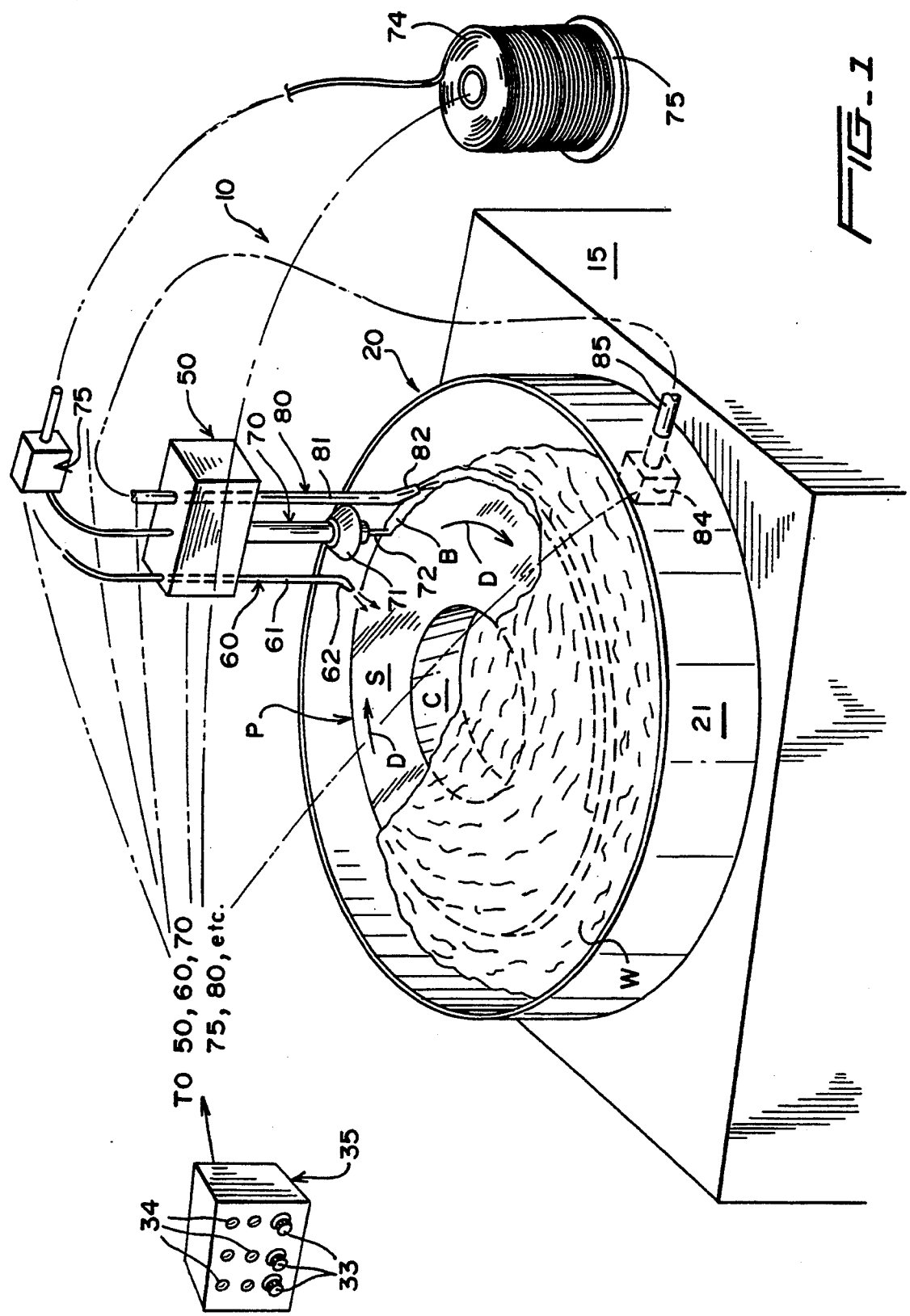
FIG. 1 is a schematic perspective view of a novel apparatus of this invention, and illustrates a turntable supporting an annular product partially immersed in a quenching bath and a head carrying an air nozzle, a welding head and a quenching nozzle.

A novel apparatus for performing the method of the present invention by applying a weld bead upon a surface of a relatively hard metal product is generally designated by the reference numeral 10 in FIGS. 1 and 3 of the drawings.

In accordance with a preferred embodiment of this invention, the hard metal product which is to be reconditioned by applying a weld bead thereto is preferably an annular wear plate or suction plate used in relatively large hydraulic pumps, and such a product or plate P is defined by a central cylindrical portion C, a flange F and an annular wall A between the cylindrical portion C and the flange F having an exterior surface S. In the case of hydraulic pump wear plates or suction plates, the surface S thereof becomes worn and must be reconditioned, and in accordance with the present invention such is accomplished by the reconditioning apparatus or welding apparatus 10. As noted earlier, however, such wear plates or suction plates P are made from extremely hard metal, namely, "chilled white iron" which have a Rockwell hardness of 55–65 (C Scale). Such chilled white iron wear plates or suction plates for hydraulic pumps are manufactured by such companies as Mobile Pulley & Machine Works of P.O. Box 1947, Mobile, Ala. 36633; GIW Industries, Inc., 5000 Wrightsboro Road, Grovetown, Ga. 30813 and Thomas Foundries, Inc., 380 North 10th Avenue, Birmingham, Ala. 35201. The chilled white iron products of these companies are known under the respective trade name/trademarks "MOBILOY," "GASITE" and "NI HARD." The hydraulic pumps manufactured by these three companies include chilled white iron wear plates/suction plates, such as the plate P, which range in diameters between 20 inches–100 inches. Obviously, when such large diameter plates P are utilized, there is an extensive amount of total surface area across the surface S from an inner periphery Pi to an outer periphery Po which must be "reconditioned" by essentially forming a continuous weld bead B (FIGS. 2 and 3) thereon in a helical side-by-side fashion beginning at the outer periphery Po and moving progressively radially inwardly as each circumferential bead portion is formed or alternatively beginning at the inner periphery Pi and forming the spiral bead in a radial outward fashion, as will be described more fully hereinafter. However, the purpose is to form a continuous side-by-side bead B across the entire surface S of the chilled white iron plate P.

The apparatus 10 includes an appropriate support 15 upon which rests a container or tank 20 defined by an outer cylindrical wall 21 (FIGS. 1 and 2), an inner cylindrical wall 22, a bottom annular wall 23 between the cylindrical walls 21, 22 and a center generally circular and inclined wall 24. The tank 20 houses quenching water W having an upper level L which can be maintained at a desired level manually or automatically, and in the latter case appropriate liquid level sensors are utilized to establish a desired level L for maintaining a desired appreciable portion of the plate P submerged, as will be described more fully hereinafter.

A generally annular turntable 30 defines means for rotating the plate P in a predetermined direction D (FIG. 1) and at a predetermined speed through a variable speed electric motor 31 having wires 32 connected to conventional control means 35 (FIG. 1) which includes a conventional microprocessor capable of being controlled through manually manipulated knobs 33 and having appropriate digital displays 34 which can be viewed for displays of such conditions as turntable rotation (rpm's), tank water temperature, weld bead voltage and amperage, quenching nozzle water temperature, and nozzle air temperature, as will be described more fully hereinafter.

The variable speed electric motor 31 is supported conventionally beneath the generally center circular inclined wall 24 and includes a shaft 36 projecting therethrough carrying a gear 37 in mesh with a ring gear 38 connected to the underside of the turntable 30. A relatively large bearing 40 defined by an upper race 41 secured to the turntable 30, a lower race 42 secured to the center inclined wall 24 and a plurality of ball bearings or balls 43 therebetween permits ease of rotation of the turntable 30 and the plate P supported thereon, preferably with the central cylindrical portion C projecting through a central circular opening (unnumbered) of the annular turntable 30, as is readily apparent in FIG. 2. It should be particularly noted that the axis of rotation R of the turntable 30 and thus of the plate P is inclined to the vertical. Accordingly, as viewed in FIG. 2, the left hand side and essentially a major portion of the plate P is totally immersed below the level L of the water W within the tank 20.

A head 50 is conventionally supported above the tank 20 and includes appropriate conventional control means for indexing the head across the surface S either in a radially inward or a radially outward direction, depending upon the point of weld bead initiation. The head 50 is schematically illustrated but is preferably an automatically surfacing system known as the Vers-O-Weld II system manufactured by Mavrix, Inc. of W. 182 S8363-B Racine Avenue, Muskego, Wis. 53150. The Vers-O-Weld II system includes a welding arm box 51 with an associated motor, a main travel beam box with its motor (not shown), a main travel beam, a welding arm, a welding head assembly 70, a wire feeder 73, and the control means or control panel 35. Preferably the wire feeder 73 is the PA-6F wire feeder of Mavrix, Inc. which includes a one-quarter horsepower motor, a feed rate adjustable between 70–600IPM, a dynamic break for eliminating weld wire coasting and forward and reverse "inching" feed. The welding head 50 can thereby be controlled for movement in the X and Y direction so indicated by the double-headed arrows associated therewith in FIG. 1. Accordingly, the head 50 can move selectively from the position illustrated in FIG. 1 radially inwardly and, of course, as the plate P rotates and the weld bead B is formed thereon, the surface S is eventually entirely covered by a spiral weld bead essentially in slightly side-to-side overlapping relationship. Obviously, depending upon the control means 35, a second pass across the surface S can be effected and, thus, a number of welds, up to 5 or 6, can be superimposed upon each other to build-up upon the surface S.

The head 50 carries means 60 in the form of an air tube 61 having a nozzle 62 of an approximately one-quarter inch orifice (unnumbered) for directing a stream of ambient air at a surface portion of the surface S of the plate P which most recently emerges from the water W during the rotation of the plate P in the direction D. Thus, any water adhering to the surface S is blown therefrom and the surface S immediately proceeding the welding means 70 including the welding head 71 and a weld wire 72 projecting therefrom is completely dry. The wire feed 73 feeds the weld wire 72 from a coil 74 of weld wire supported on a freely rotatable or driven turntable 75.

The weld wire 72 can be "Tube-Alloy 258-TIC-O" (U.S. Pat. No. 3,231,709) manufactured by McKay of 850 Grantley Road, York, Pa. 17405 or STOODY 100 manufactured by Stoody, 16425 Gate Avenue, Industry, Calif. 91749. The turntable 75 can be driven by a variable speed motor controlled by the control means 35 in a conventional manner. Thus, as the plate P rotates clockwise in FIG. 1, the weld bead B is applied thereto under an appropriate electrical control system including the power source for creating the welding arc at a predetermined amperage (225–500 amps), a predetermined voltage (24–40 v) and speed (15–80 inches/rain) again controlled by the control means 35.

Immediately downstream of the formation of the weld bead B is means 80 in the form of a tube 81 having a nozzle 82 which directs a stream of quenching water upon the weld bead B slightly downstream from its formation to rapidly quench the same as the weld bead B enters the water W during the rotation of the plate P in the direction D. The water exiting the nozzle 82 is pumped by a pump 84 in the tank 20 through a conduit 85 with the pump 84 being appropriately controlled by the control means 35. In this manner the surface S is essentially dried of the water by the air exiting the nozzle 62 followed by the subsequent formation of the weld bead B from the welding wire 72 and the subsequent quenching thereof first by the water issuing from the water nozzle 82 and then by the immersion of the plate P in the water W of the tank 20.

In FIG. 1 only the first weld bead B is illustrated being partially formed by open arc welding along the outer periphery Po of the plate P. However, as the initiation point of the weld bead approaches the weld wire 72, the control means 35 appropriately indexes the head 50 radially inwardly which thus moves the weld wire 72 into a slightly radially inboard position from that illustrated to begin the formation of the second circumferentially weld bead, and this is repeated until essentially a single spiral weld bead B covers the entire surface S from the periphery P1 to the periphery Po.

The foregoing method successfully controls the heat input at the weld point, removes water preceding the weld point and begins immediate quenching past the weld point which prevents the plate from rupturing from expansion and also prevents warping, characteristics which have heretofore been found virtually incapable of being performed in conjunction with chilled white iron products. The successive movement of a surface portion of the plate P past the air issued from the nozzle 62, the weld created at the weld wire 72 and the water issuing from the nozzle 82 followed by immersion of the major portion of the plate P at a point downstream from the point of weld and the water nozzle quenching effects the production of an extremely uniform weld bead B without in any fashion adversely affecting the integrity of the hard metal plate P.

Also, in a preferred embodiment of this invention, the point of total immersion of the plate P downstream from the weld at the weld wire 72 is approximately 40 to 42 inches therefrom. Approximately 80 to 85 inches of the lower peripheral portion (unnumbered) of the plate P is totally immersed beneath the level L of the water W within the tank 20. The latter immersion is believed to speed-up the cooling process of each weld bead B as it is formed from the point of entrance into the water W until its exit therefrom which in turn stops warpage and cracking, as earlier noted.

Although a preferred embodiment of the invention has been specifically illustrated and described herein, it is to be understood that minor variations may be made in the apparatus without departing from the spirit and scope of the invention, as defined the appended claims.

I claim:

1. A method of applying a weld bead upon a surface of relatively hard metal comprising the steps of:
   (a) moving a surface of relatively hard metal along a predetermined path of travel in a desired direction of travel,
   (b) directing stream of air at a first surface portion of the relatively hard metal surface during the movement thereof,
   (c) forming a continuous weld bead initiated at a second surface portion of the relatively hard metal surface located downstream of the first surface portion relative to the direction of travel, and
   (d) directing a stream of water at a portion of formed weld bead located downstream of the second surface portion relative to the direction of travel, whereby the surface of the hard metal is sequentially blown dry, welded and quenched.

2. The method as defined in claim 1 wherein step (a) is performed by rotating the hard metal.

3. The method as defined in claim 2 including the step of shifting the direction of the formation of the weld bead transverse to the predetermined path of travel to thereby create a plurality of side-by-side weld beads upon the relatively hard metal surface.

4. The method as defined in claim 2 including the step of shifting the direction of the formation of the weld bead transverse to the predetermined path of travel to thereby create a plurality of side-by-side weld beads upon the relatively hard metal surface, and shifting the direction of the stream of air transverse to the predetermined path of travel generally commensurate with the transverse shifting of the weld bead formation.

5. The method as defined in claim 2 including the step of shifting the direction of the formation of the weld bead transverse to the predetermined path of travel to thereby create a plurality of side-by-side weld beads upon the relatively hard metal surface, and shifting the direction of the stream of water transverse to the predetermined path of travel generally commensurate with the transverse shifting of the weld bead formation.

6. The method as defined in claim 2 including the step of shifting the direction of the formation of the weld bead transverse to the predetermined path of travel to thereby create a plurality of side-by-side weld beads upon the relatively hard metal surface, shifting the direction of the stream of air transverse to the predetermined path of travel generally commensurate with the transverse shifting of the weld bead formation, and shifting the direction of the stream of water transverse to the predetermined path of travel generally commensurate with the transverse shifting of the weld bead formation.

7. The method as defined in claim 2 including the step of at least partially immersing a portion of the hard metal excluding the first and second surface portions in a bath of water.

8. The method as defined in claim 2 wherein steps (b), (c) and (d) are performed substantially simultaneously.

9. The method as defined in claim 2 wherein the hard metal is chilled white iron.

10. The method as defined in claim 2 wherein step (a) is performed by rotating the hard metal, and synchronizing the rotation of the hard metal and the formation of the continuous weld bead.

11. The method as defined in claim 1 including the step of shifting the direction of the formation of the weld bead transverse to the predetermined path of travel to thereby create a plurality of side-by-side weld beads upon the relatively hard metal surface.

12. The method as defined in claim 11 wherein steps (b), (c) and (d) are performed substantially simultaneously.

13. The method as defined in claim 1 including the step of shifting the direction of the formation of the weld bead transverse to the predetermined path of travel to thereby create a plurality of side-by-side weld beads upon the relatively hard metal surface, and shifting the direction of the stream of air transverse to the predetermined path of travel generally commensurate with the transverse shifting of the weld bead formation.

14. The method as defined in claim 1 including the step of shifting the direction of the formation of the weld bead transverse to the predetermined path of travel to thereby create a plurality of side-by-side weld beads upon the relatively hard metal surface, and shifting the direction of the stream of water transverse to the predetermined path of travel generally commensurate with the transverse shifting of the weld bead formation.

15. The method as defined in claim 1 including the step of shifting the direction of the formation of the weld bead transverse to the predetermined path of travel to thereby create a plurality of side-by-side weld beads upon the relatively hard metal surface, shifting the direction of the stream of air transverse to the predetermined path of travel generally commensurate with the transverse shifting of the weld bead formation, and shifting the direction of the stream of water transverse to the predetermined path of travel generally commensurate with the transverse shifting of the weld bead formation.

16. The method as defined in claim 1 including the step of at least partially immersing a portion of the hard metal excluding the first and second surface portions in a bath of water.

17. The method as defined in claim 1 wherein steps (b), (c) and (d) are performed substantially simultaneously.

18. The method as defined in claim 1 wherein the hard metal is chilled white iron.

19. The method as defined in claim 1 wherein step (a) is performed by rotating the hard metal, and synchronizing the rotation of the hard metal and the formation of the continuous weld bead.

20. An apparatus for applying a weld bead upon a surface of relatively hard metal comprising:
   (a) means for moving a surface of relatively hard metal along a predetermined path of travel in a desired direction of travel,
   (b) means for directing stream of air at a first surface portion of the relatively hard metal surface during the movement thereof,
   (c) means for forming a continuous weld bead initiated at a second surface portion of the relatively hard metal surface located downstream of the first surface portion relative to the direction of travel, and
   (d) means for directing a stream of water at a portion of formed weld bead located downstream of the second surface portion relative to the direction of travel, whereby the surface of the hard metal is sequentially blown dry, welded and quenched.

21. The apparatus as defined in claim 20 wherein said moving means includes means for rotating the hard metal.

22. The apparatus as defined in claim 21 including means for shifting the direction of the formation of the weld bead transverse to the predetermined path of travel to thereby create a plurality of side-by-side weld beads upon the relatively hard metal surface.

23. The apparatus as defined in claim 21 including means for shifting the direction of the formation of the weld bead transverse to the predetermined path of travel to thereby create a plurality of side-by-side weld beads upon the relatively hard metal surface, and means for shifting the direction of the stream of air transverse to the predetermined path of travel generally commensurate with the transverse shifting of the weld bead formation.

24. The apparatus as defined in claim 21 including means for shifting the direction of the formation of the weld bead transverse to the predetermined path of travel to thereby create a plurality of side-by-side weld beads upon the relatively hard metal surface, and means for shifting the direction of the stream of water transverse to the predetermined path of travel generally commensurate with the transverse shifting of the weld bead formation.

25. The apparatus as defined in claim 21 including means for shifting the direction of the formation of the weld bead transverse to the predetermined path of travel to thereby create a plurality of side-by-side weld beads upon the relatively hard metal surface, means for shifting the direction of the stream of air transverse to the predetermined path of travel generally commensurate with the transverse shifting of the weld bead formation, and means for shifting the direction of the stream of water transverse to the predetermined path of travel generally commensurate with the transverse shifting of the weld bead formation.

26. The apparatus as defined in claim 21 including means for at least partially immersing a portion of the hard metal excluding the first and second surface portions in a bath of water.

27. The apparatus as defined in claim 20 including means for shifting the direction of the formation of the weld bead transverse to the predetermined path of travel to thereby create a plurality of side-by-side weld beads upon the relatively hard metal surface.

28. The apparatus as defined in claim 27 including means for at least partially immersing a portion of the hard metal excluding the first and second surface portions in a bath of water.

29. The apparatus as defined in claim 20 including means for shifting the direction of the formation of the weld bead transverse to the predetermined path of travel to thereby create a plurality of side-by-side weld beads upon the relatively hard metal surface, and means for shifting the direction of the stream of air transverse to the predetermined path of travel generally commensurate with the transverse shifting of the weld bead formation.

30. The apparatus as defined in claim 29 including means for at least partially immersing a portion of the hard metal excluding the first and second surface portions in a bath of water.

31. The apparatus as defined in claim 20 including means for shifting the direction of the formation of the weld bead transverse to the predetermined path of travel to thereby create a plurality of side-by-side weld beads upon the relatively hard metal surface, and means for shifting the direction of the stream of water transverse to the predetermined path of travel generally commensurate with the transverse shifting of the weld bead formation.

32. The apparatus as defined in claim 31 including means for at least partially immersing a portion of the hard metal excluding the first and second surface portions in a bath of water.

33. The apparatus as defined in claim 20 including means for shifting the direction of the formation of the weld bead transverse to the predetermined path of travel to thereby create a plurality of side-by-side weld beads upon the relatively hard metal surface, means for shifting the direction of the stream of air transverse to the predetermined path of travel generally commensurate with the transverse shifting of the weld bead formation, and means for shifting the direction of the stream of water transverse to the predetermined path of travel generally commensurate with the transverse shifting of the weld bead formation.

34. The apparatus as defined in claim 33 including means for at least partially immersing a portion of the hard metal excluding the first and second surface portions in a bath of water.

35. The apparatus as defined in claim 20 including means for at lest partially immersing a portion of the hard metal excluding the first and second surface portions in a bath of water.

* * * * *